United States Patent
Brown, Jr.

[15] 3,653,065
[45] Mar. 28, 1972

[54] ELECTROGRAPHIC RECORDING SYSTEM WITH INTERLEAVED ELECTRODE GROUPS

[72] Inventor: Arling Dix Brown, Jr., Cleveland Heights, Ohio

[73] Assignee: Clevite Corporation

[22] Filed: Oct. 22, 1969

[21] Appl. No.: 868,394

[52] U.S. Cl. .................. 346/74 ES, 101/DIG. 13, 178/6.6 A
[51] Int. Cl. .................. G03g 13/00, G03g 15/00, H04n 1/24
[58] Field of Search .................. 346/74 ES; 101/DIG. 13; 178/6.6 A

[56] References Cited

UNITED STATES PATENTS

| | | | |
|---|---|---|---|
| 2,955,894 | 10/1960 | Epstein | 346/74 ES |
| 3,131,256 | 4/1964 | Frohbach | 346/74 ES X |
| 3,178,718 | 4/1965 | Le Baron | 346/74 ES |
| 3,208,076 | 9/1965 | Mott | 346/74 ES |
| 3,449,753 | 6/1969 | Starr | 346/74 ES |
| 3,523,158 | 8/1970 | Zaphiropoulos | 346/74 ES X |

Primary Examiner—Howard W. Britton
Attorney—Eber J. Hyde

[57] ABSTRACT

Recording electrodes of a coincidence voltage type electrographic recorder are divided into arrays. Arrays are divided into two or more groups and are interleaved so that no array is adjacent another array of the same group. Like-numbered electrodes of each array in a group are connected together. Complementary electrodes are disposed adjacent to the arrays. Each is adjacent to only one array of a group and is spaced from all other arrays of the same group. A latent image is formed at one selected recording electrode when suitable voltage is applied to that electrode, and in coincidence therewith, suitable voltage is applied to complementary electrode means adjacent to the selected recording electrode.

11 Claims, 10 Drawing Figures

INVENTOR.
ARLING DIX BROWN, JR.
BY
*Eber J. Hyde*
ATTORNEY

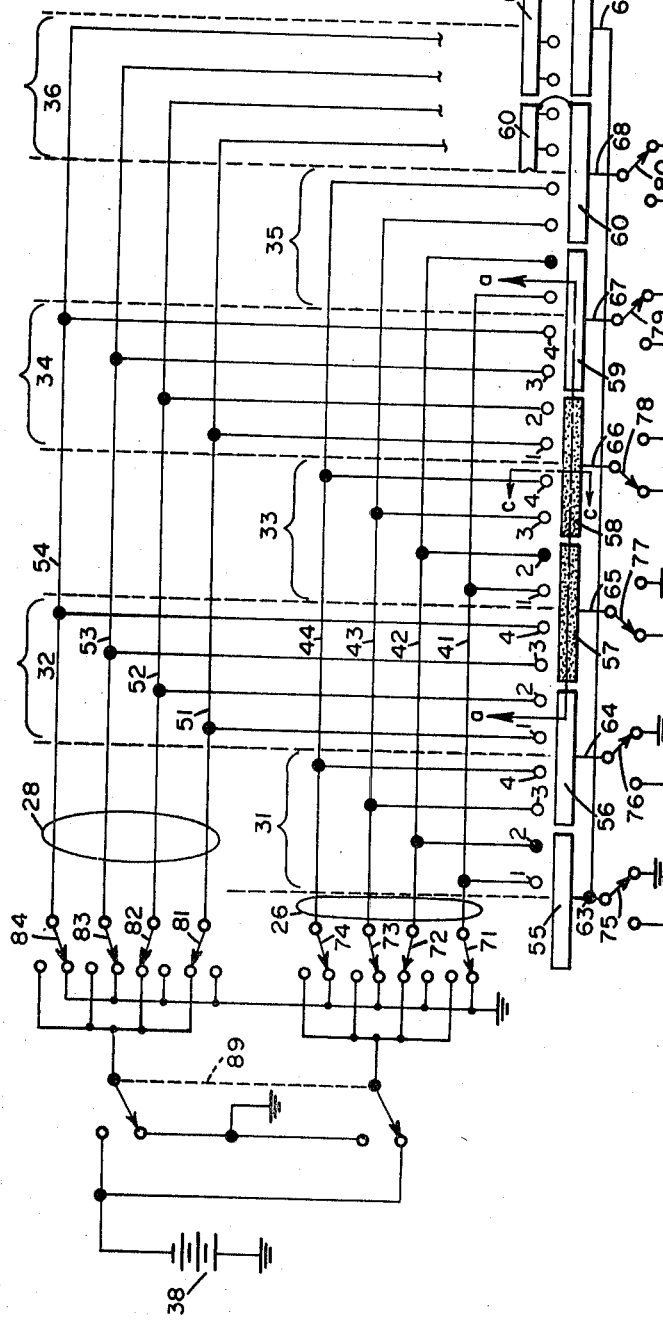
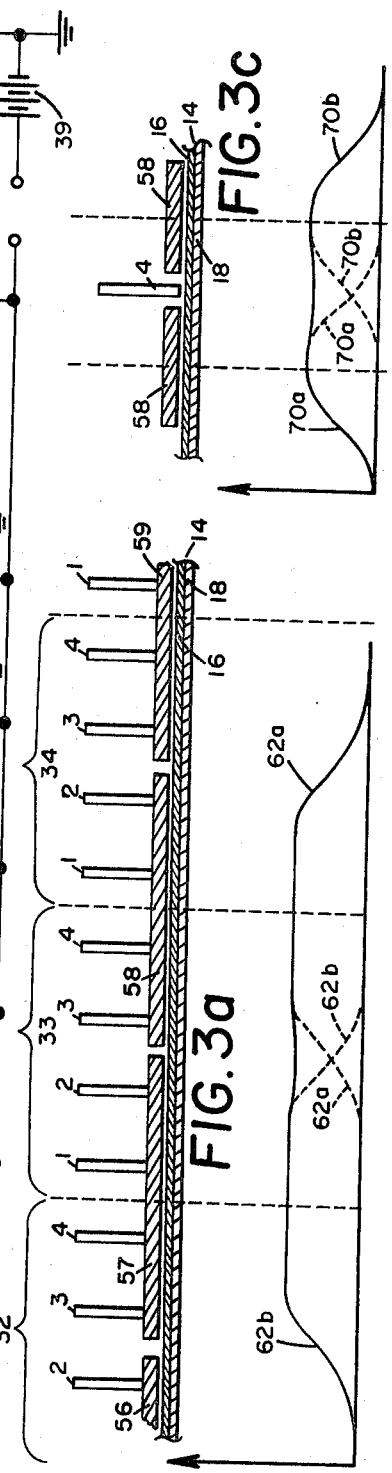
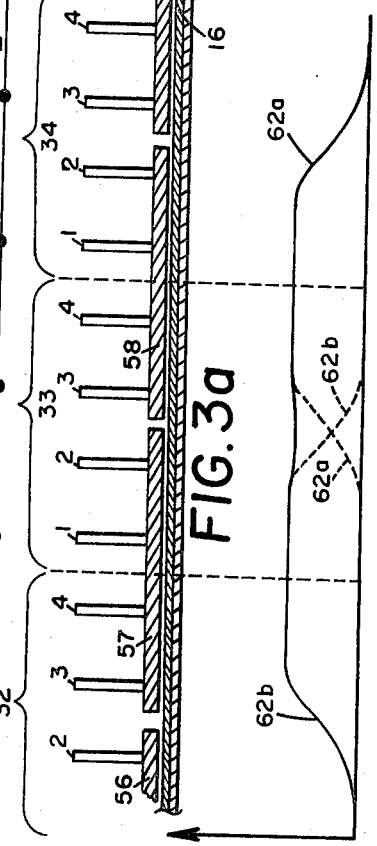
FIG.2
FIG.3a
FIG.3b
FIG.3c
FIG.3d
INVENTOR.
ARLING DIX BROWN, JR.
BY
*Eber J. Hyde*
ATTORNEY

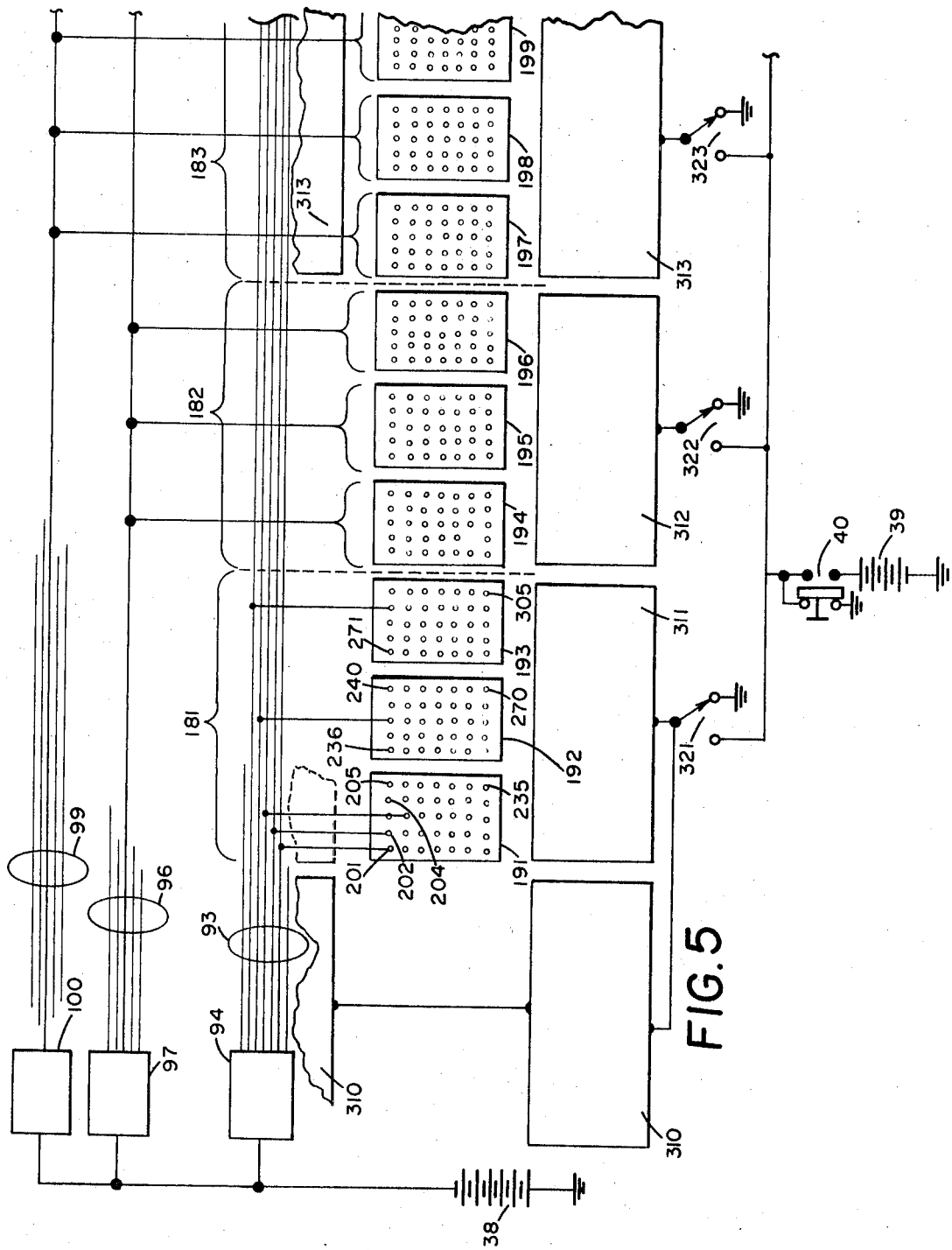

ELECTROGRAPHIC RECORDING SYSTEM WITH INTERLEAVED ELECTRODE GROUPS

This invention relates to improvements in electrographic recording systems. The present application is related to an application of John Blumenthal, Ser. No. 812,821, filed Apr. 2, 1969, entitled "Electrographic Imaging System and Head Therefor," assigned to the same assignee as the present invention.

BACKGROUND OF INVENTION

1. Field of Invention

This invention relates to electrographic recording systems. The electrographic recording process is generally characterized by two basic steps. The first step is the establishment of an electrostatic latent image by electrically charging areas on selected portions of a record medium by electrostatic recording electrodes connected to charging circuit means. In the second step the electrostatic latent image is rendered visible by the toning or developing of the charged areas on the record medium.

The present invention is directed to an improvement in the first step, that is, an improved electrographic imaging system for the establishment of the electrically charged areas on the record medium.

2. Description of the Prior Art

In general, the prior art provides recording electrodes which terminate adjacent to the charge retentive surface of a dielectric layer of the record medium upon which it is desired to deposit an electrostatic charge. A complementary electrode is located opposite the side of the record medium on which the electrostatic charge is to be deposited. For example, in U.S. Pat. No. 2,919,171 issued Dec. 29, 1959, to Epstein and Phelps, the record medium is threaded between the recording electrodes and the complementary electrode or backing bar and is held in intimate contact with the latter while remaining spaced from the former. The signal information voltage of given polarity is applied to selected recording electrodes, and it is not great enough, by itself, to charge an area of the record medium. A supplemental voltage of opposite polarity and of a magnitude insufficient by itself to cause charging of the record medium is applied to the complementary electrode which is in physical contact with the record medium. When the two voltages are simultaneously applied, the resultant total voltage is sufficient to cause an electrical charge to be applied from the recording electrode across the air gap to the surface of the dielectric layer. This is sometimes referred to the coincident voltage type of electrographic recording.

To reduce the number of driver circuits for applying the required charging voltage to the recording electrodes, the electrodes may be equally divided into arrays, and like-numbered electrodes in each array may be connected together, providing only as many recording circuits as there are recording electrodes in a single array. A plurality of complementary electrodes or backing bars are provided, one in registration with each array of recording electrodes.

To form a latent image on the record medium adjacent to one recording electrode, the signal information voltage is applied to the circuit connected to that recording electrode. Due to the interconnections, all like-numbered recording electrodes receive the same signal information voltage.

The supplemental voltage required to establish the latent image is applied only to the complementary electrode in registration with the array containing the recording electrode where the image is desired. The like-numbered recording electrodes in other arrays are not expected to establish a latent image because the complementary electrodes associated with these arrays are not energized.

One difficulty with prior art recorders is the necessity for threading the record medium between the recording electrodes and the complementary electrodes. This difficulty has been overcome by placing the complementary electrodes on the same side of the record medium as the recording electrodes and employing capacitive coupling from the complementary electrodes to a conductive layer in the record medium, as more fully described in the above-mentioned application, Ser. No. 812,821, John Blumenthal. This improvement alone has attendant difficulties however. The voltage induced at the conductive layer tends to be greatest near the central region of the complementary electrode and falls off in areas near the ends of the complementary electrode. Thus, recording at electrodes near the ends of the complementary electrodes may not be satisfactory.

An object of the invention is to provide an improved electrographic recording system wherein capacitive coupling is utilized.

Another object of the present invention is to provide an electrographic recording system having recording electrode means which are located only on one side of the record medium, thereby providing easier threading of the record medium.

A further object of the present invention is to provide an electrographic recording system that, because of capacitive coupling, is essentially insensitive to the thickness and variations in thickness of the record medium.

A further object of the present invention is to provide an electrographic recording system in which critical alignment between recording electrodes and backing electrodes is not required.

Further objects and advantages of the invention will appear from the following detailed description to be read in conjunction with the accompanying drawings wherein like reference symbols denote corresponding parts throughout the several figures.

SUMMARY OF THE INVENTION

In accordance with this invention there is provided an improved electrostatic recording system for printing on an electric charge retentive record medium. Recording electrodes are mounted with an area of each electrode in close proximity to the record medium. The recording electrodes are divided into arrays. Circuit means interconnect like-numbered recording electrodes of separated arrays to establish at least two electrically independent groups of arrays, with each array of each group separated from every other array of that group by at least one array of another group.

Complementary electrode means are mounted with an area of each in electrical cooperative relationship with the record medium. Each complementary electrode means is mounted adjacent a single array of a group of arrays and spaced from all other arrays of that group by at least a portion of an array of another group.

Means are provided for applying a voltage of one polarity to a selected recording electrode facing the area on the record medium where it is desired to establish a latent image. Due to the above-mentioned circuits interconnecting recording electrodes in different arrays, the voltage also is applied to other electrodes where images are not desired.

Means are also provided for applying in coincidence with application of voltage to the selected recording electrode, a voltage of opposite polarity to a complementary electrode means which is adjacent to the selected recording electrode, while complementary electrode means adjacent to the other energized recording electrodes are maintained in deenergized state. A latent image is established only where there are coincident voltages on recording and adjacent complementary electrode means.

BRIEF DESCRIPTION OF THE DRAWINGS

In the drawings:

FIG. 2 is a diagrammatic representation of an electrographic recording system utilizing a recording head similar to the head shown in FIG. 1.

FIG. 3a is a sectional view through lines A—A of FIG. 2.

FIG. 3b is a graph illustrating the action of the electrodes in FIG. 3a.

FIG. 3c is a sectional view through line C—C of FIG. 2.

FIG. 3d is a graph illustrating the action of the electrodes in FIG. 3c.

FIG. 5 is a diagrammatic representation of an electrographic recording system adapted for a single-line character printing.

DESCRIPTION OF THE PREFERRED EMBODIMENTS

Figure 1:
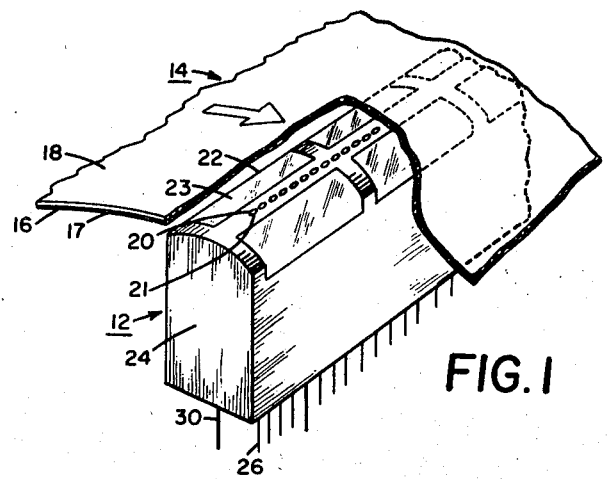
FIG. 1 is a perspective view of a portion of an electrostatic recording means or head adjacent to the exposed surface of a dielectric layer of an electrographic record medium on which an electrostatic latent image is to be formed; the head being a single-row aligned head.

Referring to FIG. 1 of the drawing, there is shown an electrographic recording head which is particularly suitable for use with the present invention. It is described and claimed in the aforementioned U.S. Pat. application Ser. No. 812,821. The head 12 is shown with an electrographic record medium 14 which is given relative displacement to the recording means 12 by means not shown.

The electrographic record medium 14 comprises a dielectric layer or stratum 16 in contact with a conductive portion 18. Suitable thicknesses for the dielectric layer range from 0.1 to 1.25 mil. Good results have been obtained with conductive portions having sheet resistances ranging from 0.25 to 1.0 megohm/square. The dielectric layer 16 has an exposed charge retentive surface 17 which, in operation, substantially engages the surface of the head 12. The conductive portion or layer 18 may take a variety of forms. For example, it may be a single layer of conductive material, or a plurality of layers of equal or different thicknesses and different conductivities.

The head 12 comprises closely spaced recording electrodes 20 having relatively small-area exposed portions or ends 21, and complementary electrodes 22 having relatively large-area exposed portions 23.

The recording electrodes 20 are generally small, closely spaced, electrical conductors embedded in a support 24 composed of a suitable dielectric material such as a plastic or a ceramic, with their end faces 21 substantially flush with the end surface of support 24. By way of illustration, the recording electrodes 20 can be approximately 10 mils in diameter and spaced on approximately 12.5 mil centers so that they are separated by about 2.5 mils. The recording electrodes 20 shown in FIG. 1 are arranged in a single row; however, they are adapted to a variety of other arrangements and may, for example, be arranged to represent alpha-numeric symbols or the like.

To provide the small, effective gap required for satisfactory recording, the exposed end areas 21 of recording electrodes 20 may be recessed so that they are spaced slightly from the record medium. Effective spacing in the range of 0.05 mil to 0.4 mil is desirable. I prefer, however, to have the end areas flush with the end surface of support 24, and obtain effective spacing by utilizing the invention of U.S. Pat. application Ser. No. 694,654, filed Dec. 29, 1967, in the names of Arling Dix Brown, Jr., and John Blumenthal, and assigned to the same assignee as the present invention. In the Brown and Blumenthal application, small spacing particles are attached to or embedded in the dielectric layer of the record medium to provide the desired spacing.

The complementary electrodes 22 are mounted on the support 24 so that their surfaces 23 are substantially flush with the end surface of the support 24 and the end faces 21 of the recording electrodes 20, forming a smooth, preferably slightly curved surface which the record medium engages during operation of the system. The complementary electrodes 22 are generally rectangularly shaped electrical conductors having their long sides in a parallel relationship to each other, and having the recording electrodes 20 centered between and in a line parallel to the complementary electrodes 22.

The recording electrodes 20 extend down into the support 24 and by means of conductors 26 are connected to energizing circuit means. Conductors 30 are connected internally to the complementary electrodes 22 and extend through the support 24 for connections to other energizing circuit means.

FIG. 2 shows how the recording electrodes and complementary electrodes of a recording head, similar to the head of FIG. 1, may be connected.

The recording electrodes are divided into arrays 31, 32, 33, 34, 35, 36. Each array contains recording electrodes 1, 2, 3, 4. Like-numbered recording electrodes of arrays 31, 33, 35 are connected together by conductors 41, 42, 43, 44 to form a first group of arrays 26. Like-numbered recording electrodes of arrays 32, 34, 36 are connected together by conductors 51, 52, 53, 54 to form a second group of arrays 28 which is electrically independent of group 26. Each array in group 26 is separated from every other array in group 26 by an array of group 28.

Pairs of complementary electrodes 55, 56, 57, 58, 59, 60, 61 straddle the row of arrays 31–36. To avoid confusion with the many lines representing interconnections between electrodes 1, 2, 3, 4, not all of the complementary electrodes are shown.

The complementary electrode pairs are offset with respect to the arrays so that each array is adjacent to the central area of two complementary electrode pairs.

Each complementary electrode pair is adjacent to only one array of one group 26 or 28 and is separated from every other array of that group by at least a part of an array of the other group. For example, complementary electrode pair 57 is adjacent to array 33 of group 26. It is separated from array 31 of group 26 by electrodes 1, 2 of array 32 of group 28. It is separated from array 35 of group 26 by array 34 of group 28.

Recording electrodes 1–4 of groups 26 and 28 are connected by conductors 41–44 and 51–54 to means for applying a voltage of one polarity to selected electrodes. Complementary electrodes 55–61 are connected by conductors 63–69 to means for applying a voltage of opposite polarity to selected electrodes.

For simplicity in illustrating the invention, the selective voltage applying means are shown as batteries connected to the electrodes by simple switches. In the "off" position, each selector switch grounds the electrodes to which it is connected.

Battery 38 supplies voltage for the recording electrodes. Electrodes in group 26 are selected by switches 71–74, and switch 89. Electrodes in group 28 are selected by switches 81–84, and switch 89.

Complementary electrodes 55–61 are selected by switches 75–80. With one or more of these switches is "on," a pulse may be applied by battery 39 to the selected electrodes by momentarily closing switch 40.

The voltage applied to a selected recording electrode by battery 38 alone is insufficient to form a latent image on the record medium. However, when a complementary electrode pair adjacent the selected electrode is pulsed by battery 39 through switch 40, the voltage between the selected recording electrode and the conductive layer of the record medium is increased momentarily to form the desired latent image. The increase in voltage is due to the capacitive coupling between the energized complementary electrodes and an area of the conductive layer under the energized recording electrode, as more fully explained in copending application Ser. No. 812,821.

Switch 89 insures that voltage from battery 38 is applied to electrodes of only one group, 26 or 28, at a time. This arrangement permits the switches of the unenergized group to be set during the time that recording is taking place at electrodes of the other group.

FIG. 3c is a section taken along line C—C of FIG. 2 showing complementary electrode pair 58 and recording electrode 4 adjacent to dielectric layer 16 of record medium 14. FIG. 3d is a graph with abscissa corresponding to horizontal position in FIG. 3c. The ordinate represents the potential of the conductive layer 18 when electrode pair 58 are pulsed. The portions of the curve labeled 70a show that as the left-hand complementary electrode 58 is pulsed alone, the potential of the conductive layer peaks under the center of the electrode and falls off toward the edges of the electrode. Similarly, the portions of the curve labeled 70b show the potential distribution for the right-hand electrode 58. The solid line curve shows the potential distribution for the pair of electrodes 58 when they are connected together as in FIG. 2. The two individual potential distributions 70a and 70b reinforce each other under recording electrode 4 to establish adequate potential for satisfactory recording at electrode 4 if it is energized.

FIG. 3a is a section taken along lines A—A of FIG. 2 showing complementary electrodes 57, 58, and portions of complementary electrodes 56 and 59 adjacent to the dielectric layer 16 of record medium 14. FIG. 3b is a graph with abscissa corresponding to the horizontal position in FIG. 3a. It illustrates how the potential of conducting layer 18 may vary with position when selected complementary electrodes are pulsed. When complementary electrode 58 is pulsed, the potential of conducting layer 18 is maximum under the center of the electrode and falls off substantially at the ends of the electrodes. This is illustrated in FIG. 3b by the portions of the curve labeled 62a. Under this condition, satisfactory recording could be made at electrode 4, array 33, or at electrode 1, array 34, if either of these electrodes were energized. On the other hand, at electrode 3, array 33, and electrode 2, array 34, the pulsed potential of the conducting layer 18 could be too low for satisfactory recording. For this reason, I prefer to offset the complementary electrodes with respect to the arrays of recording electrodes, as shown in FIGS. 2 and 3a, and energize the two pairs of complementary electrodes adjacent to the array at which recording is desired. For example, complementary electrode pairs 57, 58 are energized together when recording at array 33. The solid line curve of FIG. 3b shows that the potential distribution under array 33, being the composite of curves 62a and 62b, is substantially uniform. The two energized complementary electrode pairs act as one long complementary electrode means extending beyond the selected array of recording electrodes so that all of the latter are opposite the region of conductive layer 18 which is at high potential. The double length complementary electrode means is made possible by dividing the recording electrode arrays into two electrically independent groups.

In FIG. 2, I have shown switch positions for establishing a latent image only at recording electrode 2, array 33. Switch 89 connects battery 38 to switches 71, 72, 73, 74, and grounds switches 81, 82, 83, 84. Switch 72 is "on," thus energizing electrode 2 of array 33. Due to the interconnections provided by conductor 42, electrodes 2 of arrays 31 and 35 also are energized. Switches 77, 78 are "on," thus establishing complementary electrode pairs 57, 58 as the complementary electrode means for selectively establishing a latent image only at electrode 2, array 33, when pulse switch 40 is actuated. For easy identification, the electrodes associated with "on" switches have been shaded or blackened.

Latent images are not established at recording electrodes 2 of arrays 31, 35, even though these electrodes are energized because adjacent complementary electrodes 55, 56, 59, 60 are grounded. Latent images are not established at any electrodes of arrays 32, 34, even though some of them are close to pulsed complementary electrodes 57, 58 because they are in a different group and are grounded.

Each complementary electrode 56–60 may be used alternatively as a part of two different complementary electrode means. In the example illustrated by switch positions and electrode shading in FIG. 2, electrode 58 is connected to electrode 57 to form complementary electrode means for recording electrodes in array 33. However, when a latent image is to be formed at one or more recording electrodes of array 34, the same electrode 58 is combined with electrode 59 to form complementary electrode means for array 34.

Although I prefer to establish complementary electrode means by energizing two complementary electrode pairs, it should be understood that this is not always necessary. Satisfactory recording may be made at recording electrodes near the centerline of an energized complementary electrode pair without energizing an adjacent complementary electrode.

It should be understood that selected individual recording electrodes may be energized one at a time, together with adjacent complementary electrode means in each case, to record a row of dots in selected positions. The record medium may then be advanced and another row of dots recorded in selected positions, etc., to form a desired composite image. The record medium may be stopped for each line recorded, or, it may be in continuous motion.

Alternatively, depending on the nature of the recording information, several recording electrodes in one array may be energized simultaneously.

In the present embodiment there are two rows of flanking complementary electrodes. The system of the present invention will also work by using a single row of complementary electrodes, but usually will require higher pulse voltages for the complementary electrodes to offset the fall-off of potential illustrated in FIG. 3d.

Figure 4:
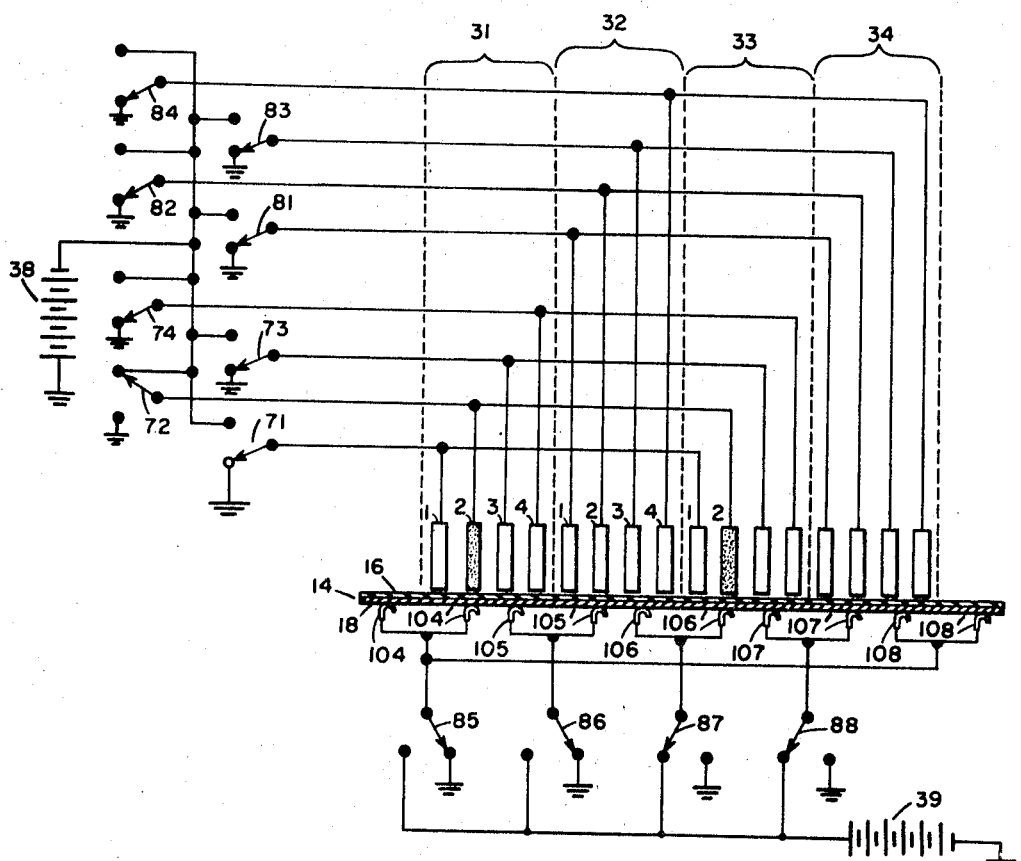
FIG. 4 is a diagrammatic representation of an electrographic recording system having a different electrode arrangement.

The utility of this invention is not limited to systems employing capacitive coupling of the complementary electrodes to a conductive layer of the record medium. As an alternative, the electrical cooperative relationship between complementary electrodes and record medium may be established by mounting the complementary electrodes to make electrical contact with the conductive layer as shown diagrammatically in FIG. 4. In FIG. 4 the complementary electrodes are in the form of spring fingers 104, 104'-108, 108' disposed in a row generally opposite the end faces or recording electrodes 1, 2, 3, 4. Precise alignment is not required. The record medium 14 is threaded between the end faces of the recording electrodes 1, 2, 3, 4 and the complementary electrodes 104-108', with conductive layer 18 in electrical contact with the complementary electrodes. The recording electrodes are spaced very slightly from the dielectric layer 16 of the record medium. For this purpose the medium preferably is constructed with spacers as described in copending application Ser. No. 694,654.

Recording electrodes 1, 2, 3, 4 are connected to battery 38 through selector switches 71–74 and 81–84. Complementary electrodes are connected in pairs 104, 104'; 105, 105'; etc., to battery 39 through selector switches 85–88.

When it is desired to record a dot at a selected electrode, such as electrode 2 of array 33, for example, switch 72 is closed, applying the voltage of battery 38 to electrodes 2 of both arrays 31 and 33, but not to arrays 32 or 34. Coincidentally, switches 87 and 88 are closed, applying voltage of opposite polarity from battery 39 to complementary electrode means 106, 106', 107, 107'. Due to the electrical contact between these electrodes and the conductive portion 18, the voltage of that part of the conductive portion in the vicinity of charging electrode 2, array 33, approaches the voltage of battery 39. The combination of the two voltages is sufficient to form a latent image at electrode 2, array 33.

No image is established at electrodes 2, array 31, because complementary electrodes 104, 104', 105, 105' are not energized. Electrodes of array 32, which are very close to energized complementary electrode 106' do not record because they are in a different group of arrays, and therefore they are not energized.

Figure 4A:
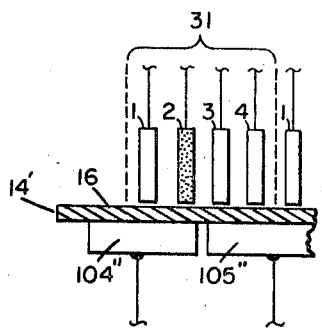
FIG. 4a illustrates a modification of the electrode arrangement of FIG. 4.

As another alternative, the spring fingers 104, 104'; 105, 105'; etc. of FIG. 4 may be replaced by electrodes 104''; 105''; etc. as shown in FIG. 4a. In this case the record medium 14' need not have a conductive portion.

FIG. 5 shows one way of applying the invention to an electrographic character line printer.

Array 181 contains 105 recording electrodes 201-305 arranged in three 5 ×7 matrices 191, 192, 193.

Array 182 has recording electrodes similarly arranged in three matrices 194, 195, 196.

Array 183 is made up of matrices 197, 198, 199.

Arrays 181, 182, 183 are disposed in horizontal alignment with additional, identical arrays not shown.

Conductors 93, 105 in number, connect recording electrodes 201-305 of array 181 to like-numbered electrodes of the fourth seventh, etc., arrays, not shown, to establish a first group of recording electrodes. Conductors 93 also connect the first group to switching means 94.

Conductors 96, 105 in number, connect recording electrodes 201-305 of array 182 to like-numbered electrodes of the fifth, eighth, etc., arrays, not shown, to establish a second group of recording electrodes. Conductors 96 also connect the second group to switching means 97.

Conductors 99 interconnect like-numbered recording electrodes of array 183 and the sixth, ninth, etc., arrays, not shown, to establish a third group of recording electrodes. Conductors 99 also connect the third group to switching means 100.

Adjacent to each array 181, 182, 183, —, etc., and in alignment therewith, is a pair of complementary electrodes 311, 312, 313, —, etc. An additional pair 310 extends beyond the adjacent array 181 and is connected to pair 311. A similar pair of complementary electrodes, not shown, extends beyond the last array on the right hand side.

The recording electrodes 201-305 of each array, and aligned complementary electrode pairs 311, 312, 313, —, etc., may be mounted generally as in FIG. 1, but with seven rows of recording electrodes, so that the charge retentive coating of the record medium is in close proximity to the exposed areas of all electrodes.

Each switching means 94, 97, 100 is adapted to connect battery 38 to selected recording electrodes 201-305 of the first, second, and third groups, respectively, of electrodes.

Switches 321, 322, 323, —, etc., connect complementary electrode pairs 311, 312, 313, —, etc., to battery 39 through pulse switch 40.

Latent images of a line of characters may be formed on the record medium in groups of three. For the first three characters, appropriate switches in switching means 94 are turned on, thus energizing those recording electrodes 201-305 in array 181 required to form the characters. For example, if the first character is to be the letter "E" then the electrodes that would be energized are:

Top row—201, 202, 203, 204, 205
2nd row—206
3rd row—211
4th row—216, 217, 218, 219, 220
5th row—221
6th row—226
7th row—231, 232, 233, 234, 235

The voltages applied to these electrodes is not sufficient to cause a latent image to be formed at any of the electrodes. Similar electrodes in the fourth, seventh, tenth, etc., arrays also are energized because of the interconnections provided by conductors 93.

Next, complementary electrode pairs 310, 311 and 312 are energized by closing switches 321 and 322, and then momentarily closing pulse switch 40. The voltage applied to these complementary electrodes momentarily changes, by capacitive coupling, the voltage of the conductive portion of the record medium under the complementary electrodes and extending under the first array 181 so that the voltage difference between this part of the conductive portion of the record medium and the energized recording electrodes in the first array is sufficient to form a latent image on the medium. Due to the separation of other energized arrays from the complementary electrodes which have been energized, there is not sufficient voltage difference to cause recording at these arrays, even though some of them have electrodes energized in parallel with the recording electrodes of the first array.

Three new characters may be recorded at the second array 182 by closing suitable switches in switching means 97 to define the characters and energizing complementary electrode pairs 311, 312, 313 by closing switches 321, 322, 323, and momentarily closing pulse switch 40.

Three characters may be recorded at the third array 183 by closing suitable switches in switching means 100 to define the characters, and energizing complementary electrode pairs 312, 313, 314 by closing switches 322, 323, 324, and momentarily closing pulse switch 40.

In similar manner, desired characters may be formed in groups of three at the fourth, fifth, etc., arrays. After a full line has been recorded, the record medium may be advanced and the next line may be recorded.

In the embodiment illustrated in FIG. 5 there are three groups of arrays of recording electrodes, with each array of each group separated from every other array of that group by two arrays, one in each of the other groups. At the moment of recording at a selected array substantially uniform complementary potential is established at the conductive layer of the record medium opposite all recording electrodes of the selected array by energizing the complementary electrode pairs which are in alignment with the selected array and also the complementary electrode pairs on either side thereof. With this three-group arrangement, offset between arrays of recording electrodes, and complementary electrodes is not employed. The use of three pairs of complementary electrodes provides, in effect, one long complementary pair approximately three times the length of an array.

Figure 6:
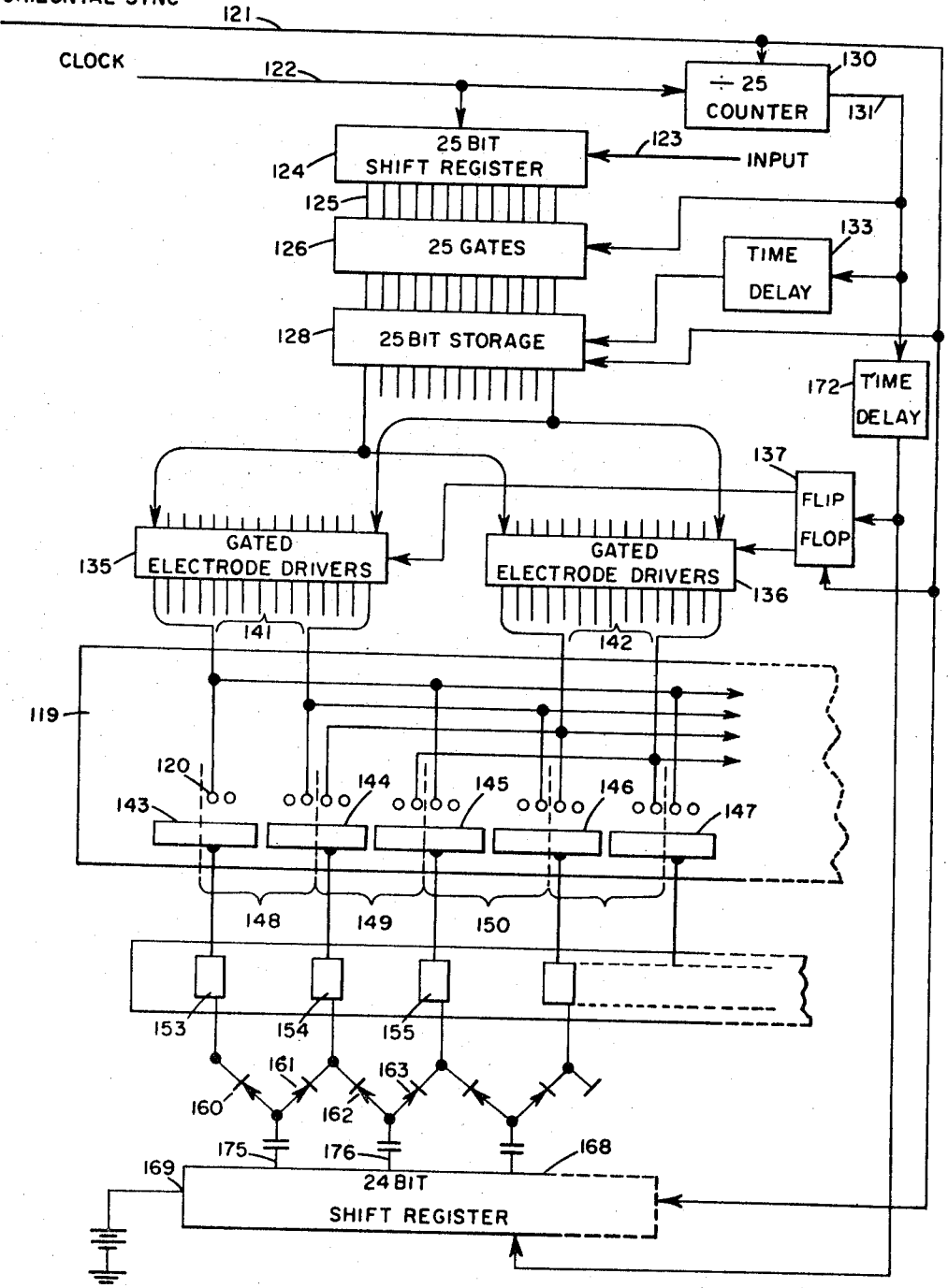
FIG. 6 is a diagrammatic representation of an electrographic recording system for making a record of a cathode ray tube display.

FIG. 6 shows an example of how an electrographic recorder employing the present invention may be used. In this example the information to be printed is taken from a cathode ray tube (CRT) system designed for the exhibit of information in alpha-numeric form. The information to be displayed may be fed into the display systems by an operator manipulating a typewriter-like keyboard, or the information may come electrically from some other source such as a computer, or a teletypewriter circuit. The beam of the CRT sweeps the screen substantially as in a conventional television receiver. Electronic character generators selected by the input information supply pulses with appropriate timing to intensity modulate the beam to form the display of the selected characters in the selected sequence and positions.

The electrical information available for the CRT display system may be tapped off to actuate an electrographic recorder employing the present invention, to obtain a permanent record of the CRT message. The information available from the CRT system is as follows:

1. A clock signal. This is a train of pulses to which all other information is synchronized. The repetition rate may be on the order of 8 mHz.

2. Horizontal synchronizing pulses which occur after each CRT horizontal sweep. For convenience, the sweep rate usually is the same as the rate used in U.S. television broadcasting so that ordinary TV sets or TV monitors may be used for remote display.

3. Serial binary information which modulates the intensity of the CRT beam to form the character images one dot at a time.

In the recorder of this example, the recording head 119 is constructed as in FIG. 1. It contains recording electrodes, 600 in a row, divided into 24 end-to-end linear arrays, with 25 electrodes in each array. Like-numbered electrodes in the first, third, fifth, etc., arrays are connected together to form one group of arrays of electrodes and like-numbered electrodes in the second, fourth, sixth, etc., arrays are connected together to form a second group of arrays of electrodes.

For the twenty-four arrays there are 25 pairs of complementary electrodes 143, 144, 145, —. To avoid confusion with the many lines representing interconnections between electrodes 120, only one complementary electrode of each pair is shown.

The record medium may be advanced over the head 119 at constant speed by a motor-drive mechanism not shown. The speed must be selected to correspond to the vertical deflection rate of the CRT display. As will be discussed in more detail in a later paragraph, this could require drive power much greater and more expensive than the application warrants. A simple modification of the CRT system, to be described in a later paragraph, takes care of this situation.

At the beginning of each CRT sweep, a horizontal synchronizing pulse is supplied to line 121. This resets shift registers 168 and storage unit 128, resets divide-by-25 counter 130, and resets flip flop 137.

The serial information bits from the CRT system are fed via line 123 to 25 bit shift register 124. Clock pulses from line 122 advance the bits from right to left through the register.

At every 25th clock pulse, the divide-by-25 counter 130 produces a pulse on line 131. Each pulse at 131 actuates gates 126 to deliver the 25 bits available at output lines 125 from register 124, to 25 bit storage unit 128 and to the inputs of gated electrode drivers 135, 136.

The first pulse at 131, after the system has been cleared by the horizontal synchronizing pulse at 121, triggers flip flop 137 to turn on gated drivers 135. This action is delayed slightly by time delay unit 172. Thus, the first 25 bits stored in unit 128 also appear suitably amplified by drivers 135 at corresponding recording electrodes in all arrays of group 141. The voltages applied to electrodes where recording is required are not high enough, alone, to establish latent images.

The first pulse at 131, delayed at 172, actuates shift register 168 to present, at first output 175, the DC level which is connected to input 169. This sends pulses through diodes 160, 161 to pulse drivers 153, 154. The pulses outputs of 153, 154 are applied to complementary electrodes 143, 144 which are adjacent to the first array 148 of recording electrodes which is in energized group 141. At this pulse occurrence latent images are established at the energized electrodes of array 148 due to the momentary increase in voltage between those recording electrodes and the conductive layer of the record medium in the regions adjacent to array 148, as described in reference to FIG. 2. The complementary electrodes adjacent to other arrays in group 141 (which also have energized electrodes) are not pulsed and, accordingly, no latent images are formed at those arrays.

After the pulsing of complementary electrode means 143, 144, the storage unit 128 is cleared by the first pulse at 131, delayed by delay unit 133.

At the 50th pulse, a second pulse occurs at 131. This gates the 26th to 50th bits, which now are in shift register 124, to storage unit 128, and the inputs of gated drivers 135, 136. The pulse at 131, delayed at 172, also triggers flip flop 137 to turn on drivers 136. Consequently, bits 26 to 50 appear as high voltages at appropriate recording electrodes in arrays of group 142.

The pulse at 131, delayed at 172, advances the DC level at 169 to output 176 of register 168. This sends pulses through diodes 162, 163 to drivers 154, 155 which energize complementary electrode means 144, 145 adjacent to the second array 149 and latent images are established at this array. Next, the storage unit 128 is cleared by the second pulse at 131, delayed at 133.

At the 75th clock pulse a third pulse appears at 131 and bits 51 to 75 are applied to recording electrodes of group 141, as in the case of bits 1 to 25. Complementary electrode means 145, 146 are pulsed and latent images are established at array 150.

The above-described process repeats, with appropriate latent images being established at successive arrays, alternately in group 141 and in group 142, until the end of the CRT sweep. A new horizontal synchronizing pulse then clears and resets the system and recording of a new line begins.

The vertical scan rate in CRT equipment of the kind considered is the same as the scan rate for conventional U.S. television transmission which is 60 scans per second. This means that the record medium would have to be moved a distance of, say 5 inches in one-sixtieth of a second. This is a transport rate of 25 feet per second, which would require expensive and bulky transport equipment. Furthermore, such large equipment would require excessive time to reach operating speed and to slow down to a stop, and this would waste large amounts of the record medium. Much slower printing of the CRT display information, on the order of ½ to 2 seconds, is quite acceptable. This obviates the problems discussed above. I have found that this slower recording may be accomplished merely by substituting a lower frequency clock in the CRT system, 500 kHz. being a suitable frequency. The low frequency clock may be substituted automatically when the recorder is energized. The resulting momentary loss of CRT display generally is not considered to be objectionable.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An electrographic recording system for recording on a record medium having a charge retentive surface, said system comprising:
    a plurality of arrays of recording electrodes, with each recording electrode mounted with an area thereof in close proximity to said charge retentive surface;
    circuit means interconnecting like-numbered recording electrodes of separated arrays to establish at least two electrically independent groups of arrays, with each array of each group separated from every other array of said group by at least one array of another group;
    a plurality of complementary electrodes mounted with an area of each in electrical cooperative relationship with said record medium, each complementary electrode being mounted adjacent to a single array of a group of arrays and spaced from all other arrays of said group by at least a portion of an array of another group;
    means for applying a first voltage of one polarity to any selected recording electrode; and
    means for applying a second voltage of opposite polarity to at least one complementary electrode adjacent to the selected recording electrode, in coincidence with said first voltage.

2. A recording system as described in claim 1 wherein the record medium is threaded between the recording electrodes and the complementary electrodes and is in intimate contact with the complementary electrodes.

3. A recording system as described in claim 2 wherein the second voltage is applied to all complementary electrodes which are closer to the array containing the selected recording electrode than they are to any other array in the group of arrays containing the selected electrode.

4. A recording system as described in claim 1 wherein the record medium has a conductive portion which is not held at ground potential, and the complementary electrodes are mounted in electrical contact with the conductive portion of the record medium.

5. A recording system as described in claim 4 wherein the second voltage is applied to all complementary electrodes which are closer to the array containing the selected recording electrode than they are to any other array in the group of arrays containing the selected electrode.

6. A recording system as described in claim 1 wherein the record medium has a conductive portion which is not held at ground potential, and the complementary electrodes are mounted adjacent to the charge retentive surface of the record medium and thereby are capacitively coupled to the conductive portion of the record medium.

7. A recording system as described in claim 6 wherein the second voltage is a voltage pulse.

8. A recording system as described in claim 7 wherein the coincident voltage pulse is applied to all complementary electrodes which are closer to the array containing the selected recording electrode than they are to any other array in the group of arrays containing the selected electrode.

9. A recording system as described in claim 7 wherein the complementary electrodes are arranged in pairs, the two electrodes of each pair being electrically connected together and disposed on opposite sides of the said adjacent array of recording electrodes.

10. A recording system as described in claim 7 wherein the arrays of recording electrodes are disposed in a line across the record medium and complementary electrodes are disposed in a line parallel to the line of arrays.

11. An electrographic recording system for recording on a record medium having a conductive layer and a charge retentive dielectric layer with an exposed surface comprising:
   a plurality of recording electrodes, each mounted with an area thereof in close proximity to said surface, the recording electrodes being disposed in a row across the record medium and being divided into equal arrays;
   circuit means interconnecting like-numbered recording electrodes of all odd-numbered arrays, and circuit means interconnecting like-numbered recording electrodes of all even-numbered arrays;
   2 ($N+1$) complementary electrodes, each having length slightly less than the length of one array, mounted in close proximity to said surface, thereby being capacitively coupled to said conductive layer, one-half of said complementary electrodes being disposed in a row parallel to the row of recording electrodes on one side thereof and adjacent thereto with the end complementary electrodes extending beyond the row of recording electrodes, the other half of said complementary electrodes being similarly disposed on the other side of the row of recording electrodes;
   means for applying a first voltage of one polarity to any selected recording electrode; and
   means for applying a voltage pulse of opposite polarity to the four complementary electrodes which are adjacent to the array containing the selected recording electrode, in coincidence with said first voltage.

* * * * *

UNITED STATES PATENT OFFICE
CERTIFICATE OF CORRECTION

Patent No. 3,653,065      Dated March 28, 1972

Inventor(s) Arling Dix Brown, Jr.

It is certified that error appears in the above-identified patent and that said Letters Patent are hereby corrected as shown below:

Column 3, line 34, "1.25 mil" should read --0.25 mil--.

Column 7, line 12, "fourth" should read --fourth,--.

Column 9, line 48, "50th pulse" should read --50th clock pulse--.

Column 11, line 21, "into equal arrays" should read --into N equal arrays--.

Signed and Sealed this ninth Day of March 1976

[SEAL]

Attest:

RUTH C. MASON
*Attesting Officer*

C. MARSHALL DANN
*Commissioner of Patents and Trademarks*

Notice of Adverse Decision in Interference

In Interference No. 98,422 involving Patent No. 3,653,065, A. D. Brown, Jr., ELECTROGRAPHIC RECORDING SYSTEM WITH INTERLEAVED ELECTRODE GROUPS, final judgment adverse to the patentee was rendered Nov. 25, 1975, as to claims 2, 3, 4 and 5.

[*Official Gazette June 22, 1976.*]

Disclaimer 3,653,065.—*Arling Dix Brown, Jr.*, Cleveland Heights, Ohio. ELECTROGRAPHIC RECORDING SYSTEM WITH INTERLEAVED ELECTRODE GROUPS. Patent dated Mar. 28, 1972. Disclaimer filed May 26, 1976, by the assignee, *Gould Inc.*

Hereby enters this disclaimer to claims 2, 3, 4 and 5 of said patent.

[*Official Gazette August 10, 1976.*]